United States Patent
Sanders

(10) Patent No.: US 9,587,788 B2
(45) Date of Patent: Mar. 7, 2017

(54) SUSPENSIONS FOR ENHANCED OIL RECOVERY

(75) Inventor: Aaron W. Sanders, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 864 days.

(21) Appl. No.: 13/701,588

(22) PCT Filed: Jun. 3, 2011

(86) PCT No.: PCT/US2011/001016
§ 371 (c)(1),
(2), (4) Date: Dec. 3, 2012

(87) PCT Pub. No.: WO2011/152882
PCT Pub. Date: Dec. 8, 2011

(65) Prior Publication Data
US 2013/0068312 A1    Mar. 21, 2013

Related U.S. Application Data

(60) Provisional application No. 61/351,575, filed on Jun. 4, 2010.

(51) Int. Cl.
*F17D 1/08* (2006.01)
*C09K 8/594* (2006.01)
(Continued)

(52) U.S. Cl.
CPC .............. *F17D 1/08* (2013.01); *B01F 5/0463* (2013.01); *C09K 8/584* (2013.01); *C09K 8/594* (2013.01); *B01F 2215/044* (2013.01); *B01F 2215/045* (2013.01); *B01F 2215/0431* (2013.01); *Y02P 20/544* (2015.11); *Y10T 137/0318* (2015.04); *Y10T 137/87571* (2015.04)

(58) Field of Classification Search
None
See application file for complete search history.

(56) References Cited

U.S. PATENT DOCUMENTS 2,623,596 A    12/1952    Whorton et al.
2,677,700 A    5/1954    Jackson et al.
(Continued)

FOREIGN PATENT DOCUMENTS

CA    2174238    4/1995
GB    2094863    9/1982
(Continued)

OTHER PUBLICATIONS

International Search Report and Written Opinion from related PCT application PCT/US2011/001016 dated Sep. 2, 2011, 13 pages.
(Continued)

*Primary Examiner* — Jeffrey Washville
(74) *Attorney, Agent, or Firm* — Brooks, Cameron & Huebsch, PLLC

(57) ABSTRACT

Embodiments of the present disclosure include suspensions for use in enhanced oil recovery, and methods of using the suspensions for recovering oil. Suspensions of the present disclosure include a nonionic surfactant that can dissolve in supercritical carbon dioxide, and a metal salt having a concentration of 200 to 1 parts-per-million.

11 Claims, 1 Drawing Sheet

(51) Int. Cl.
*B01F 5/04* (2006.01)
*C09K 8/584* (2006.01)

(56) References Cited

U.S. PATENT DOCUMENTS

| | | | |
|---|---|---|---|
| 2,866,507 A | 12/1958 | Bond et al. | |
| 2,983,763 A | 5/1961 | Krause et al. | |
| 3,065,790 A | 11/1962 | Holm | |
| 3,330,346 A | 7/1967 | Jacobs et al. | |
| 3,493,049 A * | 2/1970 | Matthews et al. | 166/272.3 |
| 3,529,668 A | 9/1970 | Bernard | |
| 4,029,879 A | 6/1977 | Muzzio | |
| 4,380,266 A * | 4/1983 | Wellington | 166/403 |
| 4,456,773 A | 6/1984 | Fock | |
| 4,483,941 A | 11/1984 | Yang | |
| 4,561,501 A * | 12/1985 | Shaw | C09K 8/584 166/270.1 |
| 4,609,043 A | 9/1986 | Cullick | |
| 4,828,029 A | 5/1989 | Irani | |
| 4,877,906 A | 10/1989 | Harper | |
| 4,902,834 A | 2/1990 | Otten et al. | |
| 4,997,906 A | 3/1991 | Thaler et al. | |
| 5,033,547 A * | 7/1991 | Schievelbein | 166/403 |
| 5,110,991 A | 5/1992 | Champion et al. | |
| 5,203,411 A * | 4/1993 | Dawe | C09K 8/58 166/268 |
| 5,484,531 A * | 1/1996 | Kuehne | B01D 61/145 210/641 |
| 5,536,883 A | 7/1996 | Le-Khac | |
| 5,789,505 A | 8/1998 | Wilkinson et al. | |
| 6,350,920 B1 | 2/2002 | Buysch et al. | |
| 6,686,438 B1 | 2/2004 | Beckman et al. | |
| 2006/0166837 A1 * | 7/2006 | Lin | C09K 8/52 507/211 |
| 2008/0182773 A1 | 7/2008 | Gauweiler et al. | |
| 2009/0173917 A1 | 7/2009 | Allen et al. | |

FOREIGN PATENT DOCUMENTS

| | | |
|---|---|---|
| JP | 2007332112 | 12/2007 |
| WO | 00/14143 | 3/2000 |
| WO | 2008006058 | 1/2008 |
| WO | 2010044818 | 4/2010 |
| WO | 2011152876 | 12/2011 |

OTHER PUBLICATIONS

International Preliminary Report on Patentability from related PCT application PCT/US2011/001016 dated Aug. 30, 2012, 21 pages.
Xing, et al. "CO2-Soluble Surfactants for Improved Mobility Control", SPE 129907, Society of Petroleum Engineers, 2010, 21 pages.
Borchardt, et al. "Surfactants for CO2 Foam Flooding", SPE 14394, Society of Petroleum Engineers, 1985, 12 pages.

* cited by examiner

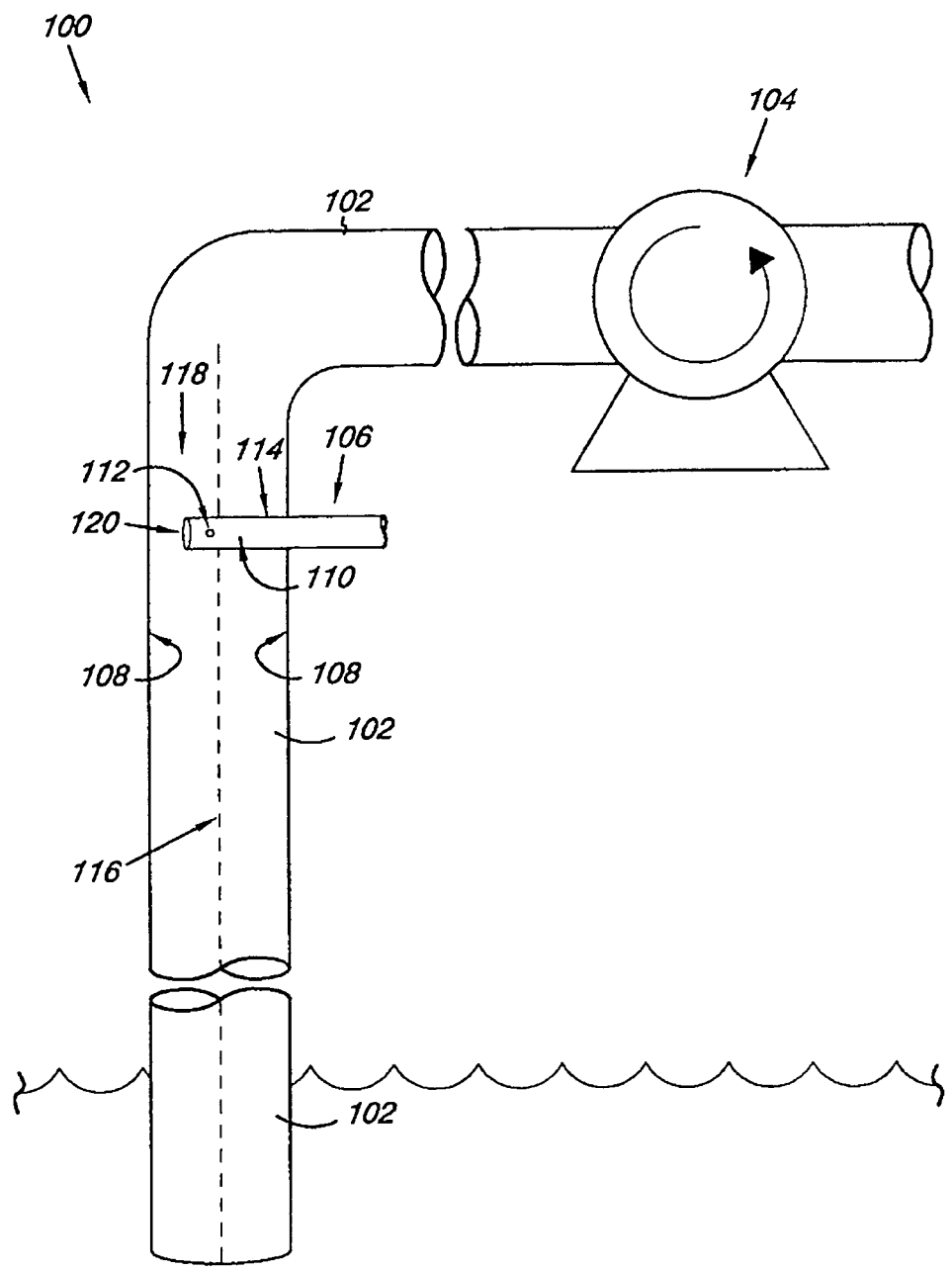

SUSPENSIONS FOR ENHANCED OIL RECOVERY

This application is a National Stage application under 35 U.S.C. 371 of PCT/US2011/001016, filed on Jun. 3, 2011 and published as WO 2011/152882 A1 on Dec. 8, 2011, which claims the benefit of U.S. Provisional Application Ser. No. 61/351,575 filed Jun. 4, 2010, the entire contents of which are incorporated herein by reference in its entirety.

FIELD OF DISCLOSURE

Embodiments of the present disclosure are directed toward enhanced oil recovery more specifically, embodiments are directed toward suspensions that include a nonionic surfactant for enhanced oil recovery and a metal salt.

BACKGROUND

A variety of techniques have been used for enhanced oil recovery (e.g., the recovery of hydrocarbons from oil containing reservoirs in which the hydrocarbons no longer flow by natural forces). Such techniques can include water injection and/or subsequent gas flooding, among others. Water injection can be useful to recover some hydrocarbons, however, only about a third of the hydrocarbons are recovered using this technique. As such, typically water injection procedures are followed by gas flooding procedures. Gas flooding can be performed with a miscible gas, which reduces the viscosity of oil present in the oil containing reservoir in order to increase the flow of hydrocarbons to a production well. Carbon dioxide, in a supercritical state, has been used as a miscible fluid to reduce the viscosity of the oil in the oil containing reservoirs. Supercritical carbon dioxide is one of the most effective and least expensive of the miscible fluid.

Gas flooding, however, can be accompanied with a number of drawbacks. One main problem encountered is poor sweep of the oil containing reservoir. Poor sweep occurs when the gas injected into the reservoir during a gas flooding process flows through the paths of least resistance due to the low viscosity of the gas, thus bypassing significant portions of the formation. When the gas bypasses significant portions of the formation, less oil is contacted with the gas, reducing the likelihood that the gas will reduce the viscosity of the oil producing poor sweep. In addition, due to the low density of the gas, the injected gas can rise to the top of the formation and "override" portions of the formation, leading to early breakthrough of the gas at the production well, leaving less gas within the oil containing reservoir to contact with the oil, again reducing the likelihood that the gas will reduce the viscosity of oil.

To enhance the gas flooding process effectiveness, it has been suggested that a surfactant be added to the supercritical carbon dioxide to generate an emulsion in the formation. An emulsion can generate an apparent viscosity of about 100 to about 1,000 times that of the injected gas, therefore, the emulsion can inhibit the flow of the gas into that portion of the oil containing reservoir that has previously been swept. In other words, the emulsion can serve to block the volumes of the oil containing reservoir through which the gas can short-cut, thereby reducing its tendency to channel through highly permeable fissures, cracks, or strata, and directing it toward previously unswept portions of the oil containing reservoir. As such, the emulsion can force the gas to drive the recoverable hydrocarbons from the less depleted portions of the oil containing reservoir toward the production well.

SUMMARY

Embodiments of the present disclosure include suspensions that include nonionic surfactants for use in enhanced oil recovery and systems and methods for enhanced oil recovery that use the suspensions of the present disclosure. In one or more embodiments, the suspension of the present disclosure include a nonionic surfactant that can dissolve in supercritical carbon dioxide ($scCO_2$) and a metal salt having a concentration of 200 to 1 parts-per-million (ppm). In one or more embodiments, the metal salt accompanies the nonionic surfactant as a result of the production methods of the nonionic surfactant. Embodiments of the present disclosure provide for nonionic surfactants that are substantially free of the metal salt (e.g., 200 to 1 ppm).

In one or more embodiments, the suspension can also include an acid selected from the group consisting of formic acid, acetic acid, and combinations thereof. In one or more embodiments, the nonionic surfactant can be selected from the group consisting of an alkylphenol alkoxylate, an alkyl alkoxylate and combinations thereof. In one or more embodiments, the metal salt can be selected from the group consisting of a carboxylate, a boron salt, a titanium salt, a metal carbonate, a metal chloride, a metal sulfate, a metal phosphate, a metal sulphonate, a metal phosphonate, a metal-cyanide salt, and combinations thereof.

In one or more embodiments, the concentration of the metal salt suspended in nonionic surfactants has been found to be an important consideration in using nonionic surfactants with $scCO_2$ for enhanced oil recovery operations. For example, it has been surprisingly discovered that the metal salt suspended in nonionic surfactants being dissolved in $scCO_2$ can deposit on piping. Given a sufficient flow rate of both the suspension containing the nonionic surfactant and the metal salt, and the $scCO_2$, depositions of the metal salt on the piping have been discovered to reduce the inner volume of the piping, even to the point of occluding the piping, in which the $scCO_2$ is being supplied.

In one or more embodiments, the present disclosure provides a method that includes supplying supercritical carbon dioxide through piping, and introducing the suspension having the nonionic surfactant and the metal salt into the supercritical carbon dioxide in the piping, the metal salt having a concentration of 200 to 1 parts-per-million. In one or more embodiments, at least a portion of the metal salt in the suspension can deposit on at least a portion of the piping. In one or more embodiments, the metal salt can be dissolved from at least the portion of the piping with an aqueous solution. In one or more embodiments, the suspension can be exposed to an oxidizing agent prior to introducing the suspension into the supercritical carbon dioxide. In one or more embodiments, exposing the suspension to an oxidizing agent can form formic acid, acetic acid, and combinations thereof in the suspension prior to introducing the suspension into the supercritical carbon dioxide.

In one or more embodiments, the present disclosure provides a method that includes supplying supercritical carbon dioxide through piping and introducing the suspension having the nonionic surfactant and the metal salt into the supercritical carbon dioxide in the piping. In one or more embodiments, the metal salt in the suspension can have a concentration of at least 200 parts-per-million. In one or more embodiments, at least a portion of the metal salt can deposit on at least a portion of the piping. The deposited metal salt can then be dissolved from at least the portion of the piping with an aqueous solution.

In one or more embodiments, the present disclosure provides a system that includes supercritical carbon dioxide flowing in piping and the suspension injected into the supercritical carbon dioxide, the suspension having the nonionic surfactant and the metal salt at a concentration of 200 to 1 parts-per-million. In one or more embodiments, the piping can have an inner diameter of 2.5 cm to 16 cm. In one or more embodiments, the supercritical carbon dioxide can flow at a rate of at least 79,000 Liters/day measured at IUPAC standard temperature and pressure. In one or more embodiments, the suspension can be injected into the supercritical carbon dioxide at a concentration of 100 to 5000 parts-per-million, where the nonionic surfactant is completely soluble in the supercritical carbon dioxide.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 1 illustrates one embodiment of a system for injecting a suspension of the present disclosure into supercritical carbon dioxide used in an enhanced oil recovery process according to the present disclosure.

DEFINITIONS

As used herein, the terms "a," "an," "the," "one or more," and "at least one" are used interchangeably and include plural referents unless the context clearly dictates otherwise.

Unless defined otherwise, all scientific and technical terms are understood to have the same meaning as commonly used in the art to which they pertain. For the purpose of the present disclosure, additional specific terms are defined throughout.

The terms "comprises," "includes" and variations of these words do not have a limiting meaning where these terms appear in the description and claims. Thus, for example, a process that comprises "a" surfactant can be interpreted to mean a process that includes "one or more" surfactants. In addition, the term "comprising," which is synonymous with "including" or "containing," is inclusive, open-ended, and does not exclude additional unrecited elements or method steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "water" can include, for example, a brine, a connate water, surface water, distilled water, carbonated water, sea water and a combination thereof. For brevity, the word "water" will be used herein, where it is understood that one or more of "brine," "connate water," "surface water," "distilled water," "carbonated water," and/or "sea water" can be used interchangeably.

As used herein, the term "metal salt" refers to an electrically neutral ionic compound composed of a metal cation(s) and an anion(s).

As used herein, a "surfactant" refers to a chemical compound that lowers the interfacial tension between two liquids.

As used herein, a "nonionic surfactant" refers to a surfactant where the molecules forming the surfactant are uncharged.

As used herein, the term "supercritical phase" or "supercritical state" means a dense gas that is maintained above its critical temperature or critical pressure (the temperature or pressure above which it cannot be liquefied by pressure or temperature).

As used herein, the term "emulsion" refers to a system in which liquid and/or droplets of a supercritical fluid are dispersed in a liquid. It is understood that in certain embodiments of the present disclosure that the carbon dioxide can exist as a gas, liquid, or supercritical fluid depending on the temperature and pressure. As used herein an "emulsion" may include a "foam," which refers to a dispersion in which a gas is dispersed in a liquid. As used herein, foam and emulsion can be used interchangeably.

As used herein, the term "suspension" refers to a system in which solid particles of metal salt are more or less uniformly dispersed in a nonionic surfactant.

As used herein, the term "piping" refers to a system of pipes used to covey fluids (liquids and/or gases) from one location to another. In one or more embodiments, piping can be used in enhanced oil recovery operations to delivery or inject fluids (e.g., supercritical carbon dioxide) into an oil containing reservoir. In one or more embodiments of the present disclosure, the piping can include additional components such as fittings, valves, pumps and other devices to provide and control the flow of the fluid(s) through the piping.

As used herein, the term "concentration" refers to a measure of an amount of a substance, such as a metal salt as discussed herein, contained per unit volume of solution. As used herein, parts-per-million (ppm) is used as one measure of concentration in which a given property exists at a relative proportion of one part per million parts examined, as would occur if a metal salt was present at a concentration of one-millionth of a gram per gram of nonionic surfactant.

As used herein, the term "oil" refers to a naturally occurring liquid consisting of a complex mixture of hydrocarbons of various molecular weights and structures, and other organic compounds, which are found in geological formations beneath the earth's surface, referred to herein as an oil containing reservoir. "Oil" is also known, and may be referred to, as petroleum and/or crude oil.

Embodiments illustrated in the figures are not to scale.

DETAILED DESCRIPTION

Embodiments of the present disclosure include suspensions that include nonionic surfactants for use in enhanced oil recovery and systems and methods for enhanced oil recovery that use the suspensions of the present disclosure. In one or more embodiments, the suspensions of the present disclosure include a nonionic surfactant that can dissolve in supercritical carbon dioxide ($scCO_2$) and a metal salt having a concentration of 200 to 1 parts-per-million (ppm). In one or more embodiments, the metal salt accompanies the nonionic surfactant as the result of the production methods of the nonionic surfactant. Embodiments of the present disclosure provide for nonionic surfactants that are substantially free of the metal salt (e.g., 200 to 1 ppm).

In one or more embodiments, the concentration of the metal salt suspended in nonionic surfactants has been found to be an important consideration in using nonionic surfactants with $scCO_2$ for enhanced oil recovery operations. For example, it has been surprisingly discovered that the metal salt suspended in nonionic surfactants being dissolved in $scCO_2$ can deposit on piping. Given a sufficient flow rate of both the suspension containing the nonionic surfactant and the metal salt, and the $scCO_2$, depositions of the metal salt on the piping have been discovered to reduce the inner volume of the piping, even to the point of occluding the piping, in which the $scCO_2$ is being supplied.

Nonionic surfactants are usually organic compounds that are amphiphilic, meaning they contain both hydrophobic groups (alkylated phenol derivatives, fatty acids, long-chain linear alcohols, etc.) and hydrophilic groups (generally ethylene oxide, propylene oxide and/or butylene oxide chains of various lengths), therefore they can be soluble in both organic solvents (non-polar) and polar solvents such as water. For example, the nonionic surfactants of the present disclosure can lower the interfacial tension between carbon dioxide (such as carbon dioxide in a supercritical state) and water. Nonionic surfactants are capable of dissolving in $scCO_2$ in dilute concentrations, where they can help to stabilize carbon dioxide-in-water emulsions and/or foams (referred to herein as "foam"), as discussed herein.

Examples of nonionic surfactants for the present disclosure include, but are not limited to, branched alkylphenol alkoxylates, linear alkylphenol alkoxylates, and branched alkyl alkoxylates. Specific examples of such nonionic surfactants can be found in "$CO_2$-Souble Surfactants for Improved Mobility Control" authored by Xing et al. (Society of Petroleum Engineers, SPE 129907, presented at the 2010 SPE Improved Oil Recovery Symposium, Tulsa OK, 24-28 Apr. 2010), which is incorporated herein by reference in its entirety. In one or more embodiments, examples of surfactants useful with the present disclosure can also be found in U.S. Pat. No. 6,686,438 to Beckman and U.S. Pat. No. 5,789,505 to Wilkinson, and the U.S. patent application entitled "Compositions for Oil Recovery and Methods of Their Use," U.S. patent application Ser. No. 61/196,235.

Nonionic surfactants can include, but are not limited to nor do they necessarily require, one or more of the following: (1) being soluble in $scCO_2$ at pressures that range from 6800 kPa to 69000 kPa and temperatures from 25° C. to 150° C.; (2) those having fluorous and/or non-fluorous composition; (3) those having $CO_2$-philic hydrocarbon tails of linear alkyl chains, branched alkyl chains, linear alkylphenol chains, and/or branched alkylphenol chains; (4) those having ethylene oxide segments (polyethylene glycol, PEG), polypropylene oxide segments, polypropylene glycol (PPG) hydrophiles, and PPG-PEG diblock hydrophiles; (5) being water soluble in addition to being $CO_2$ soluble so that the surfactant can form surfactant-stabilized lamellae; (6) be in a liquid phase at operational temperature and pressure; and (7) effective at dilute concentrations in the $scCO_2$ of 0.01 to 1 weight percent or 100 to 10000 ppm. Other nonionic surfactants that are sufficiently soluble in $scCO_2$ and that can generate carbon dioxide-in-water foams are also known.

With respect to nonionic surfactants, these can be produced using one of a number of different catalytic processes. Of these processes, one of the most common includes the use of an alkaline catalyst such as sodium alkoxide, a quaternary ammonium base or sodium hydroxide. At the end of the reaction, an acid (e.g., acetic acid, propionic acid, sulfuric acid, mixtures thereof) is used to neutralize the alkaline catalyst, thereby producing a metal salt. Metal salt can be suspended in the nonionic surfactant produced in theses processes in concentrations that range from about 500 to about 10000 parts-per-million (ppm), where a value of about 1500 ppm is typical. An example of such a process can be found, among other places, in U.S. Pat. No. 2,677,700 to Jackson et al., which is incorporated herein by reference in its entirety.

Other catalytic processes for producing nonionic surfactant include those that use a Lewis Acid catalysis process. An example of this process can be found in U.S. Pat. No. 4,483,941 to Yang, which is incorporated herein by reference in its entirety. In Yang, alkoxylation of organic materials is carried out in the presence of at least one catalyst comprising $BF_3$ and metal alkyls or metal alkoxides, $SiF_4$ and metal alkyls or metal alkoxides, and mixtures thereof. Other catalytic processes include the use of titanium catalysts, such as titanium isopropoxide and/or other titanium trialkoxide. These Lewis Acid catalysis processes, however, also must be neutralized with a base, thereby producing metal salts in concentrations from about 500 to about 2500 parts-per-million (ppm). Also acid catalyzed alkoxylations lead to harmful side products that also must be removed prior to use.

An additional catalytic process for preparing nonionic surfactants can include the use of double metal cyanide (DMC) catalysts. DMC catalysts are known for epoxide polymerization, i.e. for polymerizing alkylene oxides such as propylene oxide and ethylene oxide to yield poly(alkylene oxide) polymers, also referred to as polyether polyols. The catalysts are highly active, and give polyether polyols that have low unsaturation compared with similar polyols made using strong basic catalysts like potassium hydroxide. In addition to the preparation of polyether polyols, the catalysts can be used to make a variety of polymer products, including polyester polyols and polyetherester polyols. The polyols can be used to prepare polyurethanes by reacting them with polyisocyanates under appropriate conditions.

As appreciated, DMC catalysts are not acidic or alkaline catalysts, but are rather transition metal catalysts which do not need to be neutralized as is the case with the acidic or alkaline catalysts. The DMC catalysts are typically used at a concentration that is lower than the metal concentrations discussed herein for the acidic or alkaline catalysts process, but are still present at a concentration of at least 80 ppm. Because the DMC catalysts are not detrimental to the subsequent preparation of polyurethanes they are allowed to remain with the polyether polyol. Alternatively, removal of the DMC catalyst can be accomplished with an alkali metal hydroxide to form an insoluble salt that is then filtered.

As appreciated by one skilled in the art, carbon dioxide is in a liquid phase when subjected to a pressure of about 1,000 pounds per square inch (psi) and a temperature below about 31 degrees Celsius (° C.). In addition, the carbon dioxide can transition to a supercritical phase when, at a pressure of about 1,000 psi, the temperature rises above 31° C. In embodiments of the present disclosure, the carbon dioxide injected into the oil containing reservoir can be transferred through piping where the pressure is about 2,000 psi and temperature ranges from about 25 to about 70° C. As such, the carbon dioxide can vacillate between a supercritical phase and a liquid phase, however, for embodiments of the present disclosure the carbon dioxide is described as being in a supercritical state, behave as a liquid, and will be referred to herein as "supercritical carbon dioxide" ($scCO_2$).

In one or more embodiments, the piping used to transport the $scCO_2$ can have an inner diameter of 2.5 cm to 16 cm. Other inner diameters are possible. In addition, the piping can include additional components such as fittings, valves, pumps and other devices to provide and control the flow of the $scCO_2$ through the piping. In one or more embodiments, the $scCO_2$ flows through piping at rate of at least 79,000 Liters/day measured at IUPAC standard temperature and pressure (STP, 0° C. and 100 kPa). In one or more embodiments, the $scCO_2$ flows through piping at rate of 79,000 to 1,200,000 Liters/day measured at IUPAC standard temperature and pressure (0° C. and 100 kPa).

In one or more embodiments, nonionic surfactants discussed herein can be injected with and into the $scCO_2$ being pumped into the oil containing reservoir containing oil. When injected with the $scCO_2$ the nonionic surfactant can help promote the formation of an emulsion of carbon dioxide and water. In one or more embodiments, it is preferable to inject the nonionic surfactant into the $scCO_2$, as opposed to injecting the nonionic surfactant into or with water, for at least two reasons. First, in order to achieve an emulsion the carbon dioxide, nonionic surfactant and water must be present in intimate contact within the oil containing reservoir where the carbon dioxide is flowing. If the nonionic surfactant were dissolved in the water there is a greater likelihood that these two components will tend to the bottom regions (e.g., the water being more dense than the carbon dioxide will tend to the lower points) of the oil containing reservoir, while the carbon dioxide being relatively less dense will tend to the upper regions of the oil containing reservoir. This allows for a condition referred to as "gravity override," where the carbon dioxide flows over the top of the water with the dissolved nonionic surfactant. As such, the components do not meet creating very little, if any, emulsion in the desired locations within the oil containing reservoir. Second, carbon dioxide tends to have more mobility in the oil containing reservoir where it can meet and form an emulsion with the water. This also allows for an emulsion to be formed in more locations within the oil containing reservoir, which can be important when long term mobility control is desired.

For the various embodiments of the present disclosure, however, it has been discovered that while nonionic surfactants can dissolve in $scCO_2$, the metal salts present in the nonionic surfactants of the present embodiment remain insoluble (e.g, will not dissolve in the $scCO_2$). In addition to being insoluble, the present disclosure has discovered that these metal salts also preferentially deposit on the inner walls of the piping carrying the $scCO_2$ when the nonionic surfactant(s) are injected directly into the $scCO_2$. So, as the suspension of the nonionic surfactant and the metal salt is injected into the $scCO_2$, the nonionic surfactant is dissolved from around the metal salt, which can go on to deposit on at least a portion of the piping through which the $scCO_2$ is being supplied. In one or more embodiments, depending upon the relative volumetric flow rates of the nonionic surfactant and/or the $scCO_2$ the amount of metal salt that separates from the surfactant and can deposit onto the piping can cause changes in the inner diameter (or inner volume) of the piping used to carry the $scCO_2$. In one or more embodiments, it has also been found that the metal salts preferentially deposit on fittings along the piping, such as, for example, locations along the piping where flow rate drops or there is a change in flow pattern (i.e., through a bend, a restrictor valve, a choke).

For example, injection of a nonionic surfactant containing 2500 ppm of potassium acetate was injected at 1000 ppm in to a 5.08 cm (2 inch) OD pipe through an atomizing injection quill about 0.91 meter (about 3 feet) upstream of a rotary flow meter. The carbon dioxide in the line was at 14500 kPa (2100 psi) and 50° C. and was being injected at 476952 liters (3000 barrels) per day (STP). Blockage in the line as indicated by erratic flow readings and a drop in the pressure across the injection point was observed after 8 hours and after 70 hours flow was restricted to less than 10% of the original flow. Subsequent opening of the line showed that the flow meter was completely plugged with potassium bicarbonate and potassium acetate. The salt cation was determined using inductively coupled plasma analysis (ICP) and the anions by ion chromatography (IC). The bicarbonate is formed as the product of the equilibrium of potassium acetate and carbonic acid as well as trace amounts of surfactant trapped in the matrix. Subsequent removal of the potassium acetate to less than 25 ppm allowed for injection of surfactant at 1000-1200 ppm with no loss in pressure across the injection point. Inspection of the piping following injection for 6 weeks showed only a light dusting of potassium carbonate, which was removed by dissolution during the subsequent water cycle.

Based on this discovery, one or more embodiments of the present disclosure provide for a method in which $scCO_2$ is supplied through piping and a suspension having a nonionic surfactant and metal salt are introduced into the $scCO_2$ in the piping. As discussed herein, as the nonionic surfactant dissolves into the $scCO_2$ the at least a portion of the metal salt can deposit on at least a portion of the inner surface of the piping through which the $scCO_2$ is supplied. For a given flow rate of $scCO_2$ and for the suspension that contains both the nonionic surfactant and its given concentration of metal salt, the cross-sectional area of the piping can change in one or more locations due to the depositing metal salt.

As discussed herein, the suspensions of metal salt in the nonionic surfactants can have metal salt concentrations that are at least 200 ppm. As discussed above, these values are also known to range from about 500 to about 2500 ppm, where values of about 1000 ppm are known. In one or more embodiments, the nonionic surfactant of the suspension can be selected from the group consisting of an alkylphenol alkoxylate, an alkyl alkoxylate and combinations thereof, where examples of alkylphenol alkoxylate and alkyl alkoxylate nonionic surfactants are as discussed herein. In addition, the metal salt contained in the suspension is also as discussed herein. Examples of the metal salt include those selected from the group consisting of a carboxylate, a boron salt, a titanium salt, a metal carbonate, a metal chloride, a metal sulfate, a metal phosphate, a metal sulphonate, a metal phosphonate, a metal-cyanide salt, and combinations thereof.

In one or more embodiments, the metal salt deposits can be reduced and/or removed from the inner surfaces of the piping by use of an aqueous solution. In other words, the metal salt can be dissolved from at least the portion of the piping with the aqueous solution. Examples of aqueous solutions include, but are not limited to, water (as defined herein), brine, or formation water. In one or more embodiments, the aqueous solution can be supplied to the piping at a temperature of 10 to 70° C. and at a volumetric flow rate sufficient to cause the water to contact the inner perimeter of the piping. In one or more embodiments, dissolving at least a portion of the deposited metal salt can occur during a WAG (water-alternating-gas) or WAGS (water-alternating-gas with the surfactant dissolved in the $scCO_2$ process) process as discussed herein.

In one or more embodiments of the present disclosure, it is also possible to remove a significant portion of the metal salt present in the suspension of the nonionic surfactant and metal salt. In one or more embodiments, removing the metal salts from the nonionic surfactant can be accomplished in a number of different ways. Examples include, but are not limited to, the use of an adsorbent (such as synthetic magnesium silicate adsorbents) and water, which can be added to the nonionic surfactant. The mixture can be held at an elevated temperature of about 80° C. to about 130° C. for a predetermined amount of time (e.g., for at least one hour), after which the mixture can be filtered to separate the metal salt from the nonionic surfactant. U.S. Pat. No. 4,029,879 to Muzzio, which is incorporated herein by reference in its entirety, provides examples of this process as applied to removing catalysts from polyether polyols.

Unlike U.S. Pat. No. 4,029,879, however, the process of separating the metal salt from the nonionic surfactants according to the present discloser need not worry about forming acidic materials in the nonionic surfactant. So, for one or more embodiments of the present disclosure the suspension that includes the nonionic surfactant and the metal salt can be exposed to an oxidizing agent, such as air having oxygen as a part of its composition. For example, exposing the suspension to the oxidizing agent prior to introducing the suspension into the supercritical carbon dioxide can help to form an acid (e.g., formic acid and/or acetic acid) in the suspension. As low molecular carboxylic acids (formic, acetic) are soluble in $scCO_2$, its presence in the suspension poses no foreseeable issues with its use in enhance oil recovery processes.

In one or more embodiments, it is also possible to remove metal salt from the suspension of the nonionic surfactant when the metal salt is an alkali metal hydroxides, alkali metal hydrides, or alkali metal alkoxides by an acid capable of forming an insoluble salt, such as phosphoric acid, and filtering to remove the insoluble portion. Once again, exposing the nonionic surfactant of the suspension to air poses no apparent issues to the intended use of the nonionic surfactant.

In one or more embodiments, removing a significant portion of the metal salt present with the nonionic surfactant can provide a suspension with a nonionic surfactant and metal salt, as discussed herein, having a concentration of 200 ppm to a predetermined lower limit in ppm. In one or more embodiments, removing a significant portion of the metal salt present with the nonionic surfactant can provide a suspension with a nonionic surfactant and metal salt, as discussed herein, can also have a concentration of 100 ppm to the predetermined lower limit or 50 ppm to the predetermined lower limit.

In one or more embodiments, the lower limit for the amount of metal salt can include a value of 1, 3 or 5 ppm, where a concentration of 200 to 1 ppm, 200 to 3 ppm, 200 to 5 ppm, 100 to 1 ppm, 100 to 3 ppm, 100 to 5 ppm, 50 to 1 ppm, 50 to 3 ppm or 50 to 5 ppm is possible. In one or more embodiments, the upper limit of 200, 100 or 50 ppm to the predetermined lower limit (e.g., 1, 3 or 5 ppm) have been found to provide a preferred balance between a cost per kilogram for the suspension (keeping in mind that for a given flooding operation in an enhanced oil recovery operation thousands to millions of kilograms of the nonionic surfactant in the suspension may be used over the course of many years) and its ability to prevent significant occlusions from occurring during the injection of the $scCO_2$ during the flooding operation of an enhanced oil recovery process.

In one or more embodiments, reducing the concentration of metal salt in the suspension may allow for the nonionic surfactant to be injected into the $scCO_2$ at desired concentrations without encountering detrimental effects of at least a portion of the metal salt that may be depositing on at least a portion of the piping through which the $scCO_2$ is supplied during the flooding operation. It is appreciated that some metal salt may deposit on the piping during the course of injecting the $scCO_2$. This metal salt, however, will likely be dissolved during the water injection portion of the flooding operation. So, the reduced concentration of metal salt with the nonionic surfactant in the suspension of the present disclosure may allow for a complete $scCO_2$ injection portion of a WAGS process to occur, where any metal salt deposits on the piping can be removed by the subsequent water injection portion of the WAGS process. In one or more embodiments, it is also possible to greatly prolong, reduce and/or eliminate a water injection step to dissolve deposited metal salts on the piping used to supply $scCO_2$ and the suspension of the present disclosure during an enhanced oil recovery process.

In addition, because protecting the suspension from oxidation products (e.g., acids) is not a foreseeable problem with respect to its use in $scCO_2$, it is also possible that the suspension of the present disclosure also includes an acid. Examples of such acids include those selected from the group consisting of formic acid, acetic acid, and combinations thereof. As discussed herein, acids can be formed in the suspension of the present disclosure through their exposure to an oxidizing agent, such as an environment of air that contains oxygen. In one or more embodiments, acids may also be present in the suspension as residual reactants from the removal of the metal salt, as discussed herein. Regardless of its origin, the presences of acid in the suspension of the present disclosure poses no foreseeable problems for their use in enhance oil recovery operations.

With respect to enhanced oil recovery operations, in one or more embodiments the suspension of the present disclosure can be injected into $scCO_2$ that is being supplied through piping. In one embodiment, the nonionic surfactant can be injected into the $scCO_2$ using an injector. Examples of suitable injectors for this purpose include those disclosed in a co-pending U.S. patent application entitled "Solubilizing Surfactants into Supercritical Carbon Dioxide for Enhanced Oil Recovery" having docket number 69830 and U.S. patent application Ser. No. 13/701,575, which is incorporated herein by reference in its entirety.

Referring now to FIG. 1, there is shown a system 100 according to one embodiment of the present disclosure for injecting the suspension of the present disclosure into $scCO_2$ flowing in piping. In one or more embodiments, the $scCO_2$ and the suspension are delivered to an oil containing reservoir for enhance oil recovery, as discussed herein.

As illustrated, the system 100 includes piping 102 containing $scCO_2$, a pump 104 to supply the $scCO_2$ through the piping 102, and an injector 106 associated with the piping 102 to introduce the suspension of the present disclosure into the $scCO_2$. In one or more embodiments, an example of the pump 104 can include, but is not limited to, a pneumatic booster pump, among others. As discussed herein, $scCO_2$ is used in the system 100. Other supercritical fluids besides or in addition to $scCO_2$ could also be used in the system 100.

For one or more embodiments, the injector 106 associated with the piping 102 can have a number of different configurations. For example, as illustrated in FIG. 1, the injector 106 can have a tubular configuration that extends through a wall 108 of the piping 102. In one or more embodiments, the injector 106 includes a manifold 110 and a surface defining a port 112 that extends through the wall 114 of the injector 106 from the manifold 110. For the various embodiments, the injector 106 conveys the suspension through the manifold 110 and the port 112 to inject a jet of the suspension into the flow of the $scCO_2$ inside the piping 102. In one or more embodiments, the surfactant is injected at a predetermined volumetric value of relative the volumetric flow rate of the $scCO_2$.

As the example of FIG. 1 illustrates, the port 112 on injector 106 can be a single port 112 located at either the radial surface of the injector 106 (as illustrated in FIG. 1) or at the end 120 of the injector 106. Additional embodiments of the injector 106 discussed herein, however, can include more than one port 112. As will be appreciated, the number, the size, the spacing and/or the distribution of the ports 112 can be configured to ensure mechanical integrity of the injector 106 and to ensure that the surfactant injected through the port 112 does not impinges on the wall 108 of the piping 102.

For the various embodiments, the suspension of the present disclosure can be injected into the $scCO_2$ at a concentration of 100 to 5000 parts-per-million, where the nonionic surfactant is completely soluble in the supercritical carbon dioxide. In one or more embodiments, the suspension of the present disclosure can be injected into the $scCO_2$ at a concentration of 300 to 2000 parts-per-million, where the nonionic surfactant is completely soluble in the supercritical carbon dioxide. In one or more embodiments, the suspension of the present disclosure can be injected into the $scCO_2$ at a concentration of 500 to 1500 parts-per-million, where the nonionic surfactant is completely soluble in the supercritical carbon dioxide. As appreciated, other values for the concentration of the suspension injected into the $scCO_2$ are possible. For example, considerations for determining these other concentration values can include, but are not limited to, the flow rates of the $scCO_2$, the solubility of the nonionic surfactant in the $scCO_2$, the effectiveness of the nonionic surfactant in forming an emulsion with the $scCO_2$, and/or the concentration of metal salt in the suspension.

Although embodiments described herein include $scCO_2$ as the noncondensable gas in compositions of the present disclosure, one skilled in the art will appreciate that other noncondensable gases may also be included in place of $scCO_2$, and/or in addition to $scCO_2$. Examples of other possible noncondensable gases include, but are not limited to, nitrogen, natural gas, methane, propane, butane, ethane, ethylene, hydrogen sulfide, carbonyl sulfide, air, combustion flue gas, mixtures of methane with ethane, argon, light hydrocarbons, and mixtures thereof, among others.

In some embodiments, compositions of the present disclosure can include other additives. For example, the composition can include corrosion inhibitors, co-surfactants, scale inhibitors, antioxidants and mixtures thereof, as well as other additives. In some embodiments, the total amount of the additives added to the compositions of the present disclosure is not greater than about 5 weight percent, based on a total weight of the composition.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

Additional subject matter included in this application includes, but is not limited to, the following: The system of claim 13, where the supercritical carbon dioxide is flowing at a rate of at least 79,000 Liters/day measured at IUPAC standard temperature and pressure. The system of claim 13, where the nonionic surfactant is selected from the group consisting of an alkylphenol alkoxylate, an alkyl alkoxylate and combinations thereof. The suspension of claim 20, where the metal salt is selected from the group consisting of a carboxylate, a boron salt, a titanium salt, a metal carbonate, a metal chloride, a metal sulfate, a metal phosphate, a metal sulphonate, a metal phosphonate, a metal-cyanide salt, and combinations thereof.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the disclosure.

What is claimed:

1. A method, comprising:
   supplying supercritical carbon dioxide through piping; and
   introducing a suspension having a nonionic surfactant and a metal salt into the supercritical carbon dioxide in the piping, the suspension having a metal salt concentration of 200 to 1 parts-per-million, wherein the metal salt is produced in forming the nonionic surfactant.

2. The method of claim 1, including depositing at least a portion of the metal salt on at least a portion of the piping; and
   dissolving the metal salt from at least the portion of the piping with an aqueous solution.

3. The method of claim 1, where the nonionic surfactant is selected from the group consisting of an alkylphenol alkoxylate, an alkyl alkoxylate and combinations thereof.

4. The method of claim 1, where the metal salt is selected from the group consisting of a carboxylate, a boron salt, a titanium salt, a metal carbonate, a metal chloride, a metal sulfate, a metal phosphate, a metal sulphonate, a metal phosphonate, a metal-cyanide salt, and combinations thereof.

5. The method of claim 1, including exposing the suspension to an oxidizing agent prior to introducing the suspension into the supercritical carbon dioxide.

6. The method of claim 1, including forming a carboxylic acid in the suspension prior to introducing the suspension into the supercritical carbon dioxide.

7. A method, comprising:
   supplying supercritical carbon dioxide through piping;
   introducing a suspension having a nonionic surfactant and a metal salt into the supercritical carbon dioxide in the piping the suspension having a metal salt concentration of 200 to 1 parts-per-million, wherein the metal salt is produced in forming the nonionic surfactant;
   depositing at least a portion of the metal salt on at least a portion of the piping; and
   dissolving the metal salt from at least the portion of the piping with an aqueous solution.

8. The method of claim 7, where the nonionic surfactant is selected from the group consisting of an alkylphenol alkoxylate, an alkyl alkoxylate and combinations thereof.

9. The method of claim 7, where the metal salt is selected from the group consisting of a carboxylate, a boron salt, a titanium salt, a metal carbonate, a metal chloride, a metal sulfate, a metal phosphate, a metal sulphonate, a metal phosphonate, a metal-cyanide salt, and combinations thereof.

10. The method of claim 7, including exposing the suspension to an oxidizing agent prior to introducing the suspension into the supercritical carbon dioxide.

11. The method of claim 7, including forming a carboxylic acid in the suspension prior to introducing the suspension into the supercritical carbon dioxide.

\* \* \* \* \*